United States Patent [19]
Kawaguchi et al.

[11] Patent Number: 4,628,587
[45] Date of Patent: Dec. 16, 1986

[54] HONING STONE EXCHANGER FOR USE WITH SUPERFINISHING MACHINES

[75] Inventors: Kizo Kawaguchi; Teruo Matsuda, both of Osaka, Japan

[73] Assignee: Osaka Seiki Kabushiki Kaisha, Osaka, Japan

[21] Appl. No.: 709,173

[22] Filed: Mar. 7, 1985

[30] Foreign Application Priority Data

Mar. 8, 1984 [JP] Japan .................................. 59-44985
Oct. 3, 1984 [JP] Japan .................................. 59-207522

[51] Int. Cl.⁴ ........................ B23Q 3/155; B24B 33/00
[52] U.S. Cl. ......................................... 29/568; 51/168
[58] Field of Search ........................ 29/568; 51/168; 74/813 R, 813 C, 813 L, 816, 825; 409/231-233

[56] References Cited

U.S. PATENT DOCUMENTS 3,824,891 7/1974 Carroll .............................. 29/568 X
4,051,583 10/1977 Kato et al. ....................... 409/231 X

FOREIGN PATENT DOCUMENTS 39296 3/1979 Japan .
50290 4/1979 Japan .
181565 10/1983 Japan .
3541 2/1984 Japan .

OTHER PUBLICATIONS

"Indexing Apparatus", *Research Disclosure*, vol. 215, (Mar. 1982), p. 70.

*Primary Examiner*—Gil Weidenfeld
*Assistant Examiner*—Steven C. Bishop
*Attorney, Agent, or Firm*—Wenderoth, Lind & Ponack

[57] ABSTRACT

A honing stone exchanger for use with superfinishing machines wherein an annular workpiece is rotated on a main axis in a shoe centerless system by a drive unit, while a honing stone for superfinishing the outer peripheral surface of the annular workpiece is oscillated concentrically with the center of curvature of the outer peripheral surface by an oscillation unit, the honing stone exchanger being characterized in that it comprises a mechanism for stopping the oscillation shaft of the oscillation unit and positioning and fixing it at a predetermined position, a mechanism for moving a stone holder out of a processing position to a honing stone exchange position, and a mechanism for feeding a reserve honing stone to the stone holder moved to the honing stone exchange position.

12 Claims, 9 Drawing Figures

HONING STONE EXCHANGER FOR USE WITH SUPERFINISHING MACHINES

FIELD OF THE INVENTION

The present invention relates to a honing stone exchanger for use with superfinishing machines used to superfinish the outer or inner peripheral surfaces of annular workpieces.

DESCRIPTION OF THE PRIOR ART

The outer or inner peripheral surfaces of the inner rings of conical roller bearings, ball bearings, and self-aligning roller bearings are superfinished by superfinishing machines. In this kind of superfinishing machines, the wear of honing stones cannot be avoided.

Thus, each time the honing stone wears out, it must be exchanged for a fresh one. Heretofore, this exchange operation has been manually performed.

Such manual exchange system, however, results in very low efficiency and high production cost, this drawback being noticeable particularly in the case of mass-produced products as in said bearings.

With the above in mind, we have previously proposed honing stone exchangers designed for automatic exchange of honing stones, in Japanese Laid-Open patent Application No. 181565/1983 (Japanese Patent Application No. 64349/1982) and 30638/1984 (Japanese Patent Application No. 138750/1982, Japanese Patent Publication No. 3541/1985).

OBJECT AND SUMMARY OF THE INVENTION

An object of the invention is to provide a honing stone exchanger capable of increasing efficiency of exchange operation and decreasing production cost by automating the conventional manual honing stone exchange.

The honing stone exchanger of the present invention comprises a mechanism for stopping the oscillation shaft of the oscillation unit of a superfinishing machine and positioning and fixing it at a predetermined position, a mechanism for moving a stone holder out of a processing position to a honing stone exchange position, and a mechanism for feeding a reserve honing stone to the stone holder moved to the honing stone exchange position.

BRIEF DESCRIPTION OF THE DRAWINGS

These and other features and objects of the invention will be understood from the following detailed description of the preferred embodiments taken with the accompanying drawings in which:

FIGS. 1 through 4 show an embodiment of the invention applied to a superfinishing machine for superfinishing the outer peripheral surfaces of annular workpieces, wherein FIG. 1 is a plan view of a superfinishing machine equipped with a honing stone exchanger, the machine being shown partly cut away; FIG. 2 is a front view of the same, FIG. 3 is a left-hand side view of the same; and FIG. 4 is a fragmentary enlarged view showing a superfinishing operation being performed by the superfinishing machine.

FIGS. 5 through 9 show an embodiment of the invention applied to a superfinishing machine for superfinishing the inner peripheral surfaces of annular workpieces, wherein FIG. 5 is a plan view of a superfinishing machine equipped with a honing stone exchanger, the machine being shown partly cut away; FIG. 6 is a front view of the same, FIG. 7 is a left-hand side view of the same; FIG. 8 is a side view showing a superfinishing operation being performed by said superfinishing machine; and FIG. 9 is a side view showing a superfinishing operation being performed by said superfinishing machine.

DETAILED DESCRIPTION OF THE PREFERRED EMBODIMENTS

Figure 1:
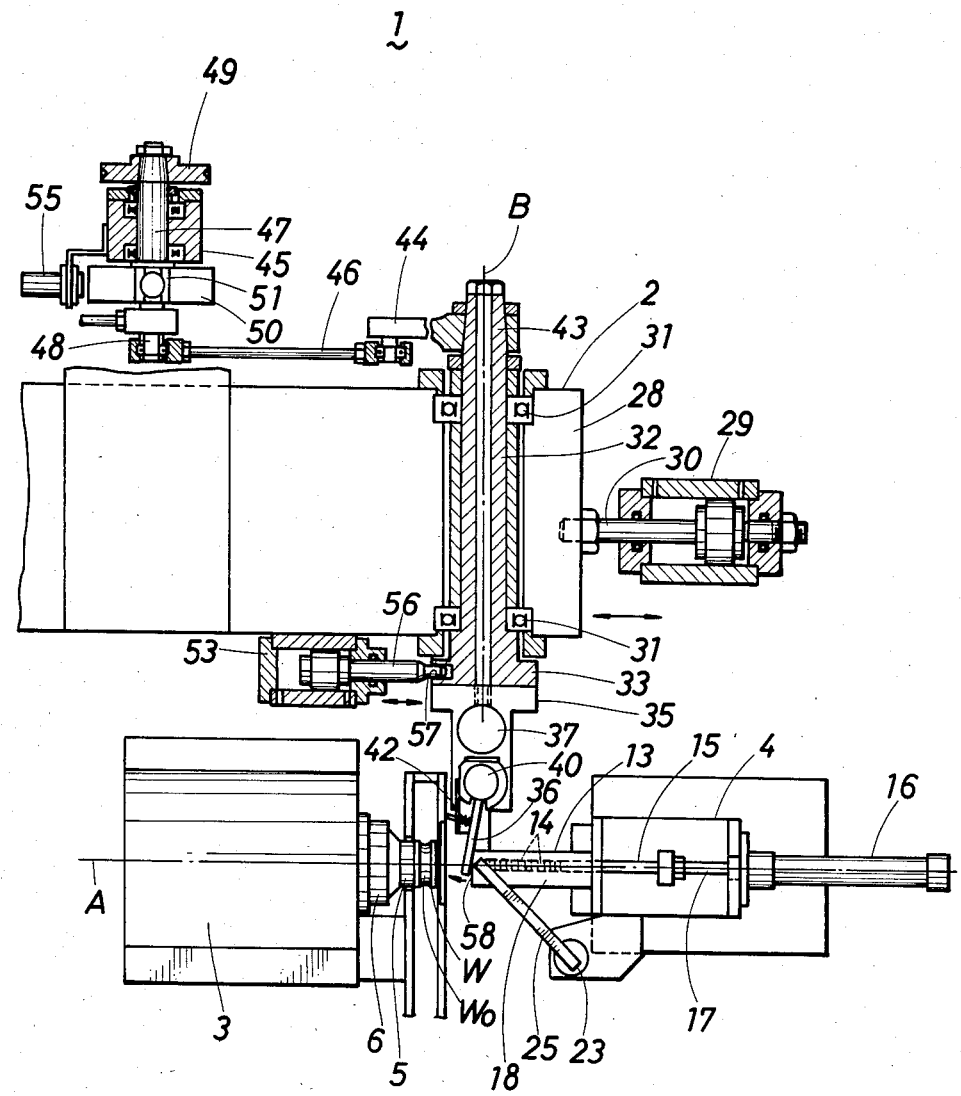

The invention will now be described with reference to an embodiment thereof shown in the drawings, which is applied to a superfinishing machine for superfinishing the outer peripheral surfaces of annular workpieces.

Figure 2:
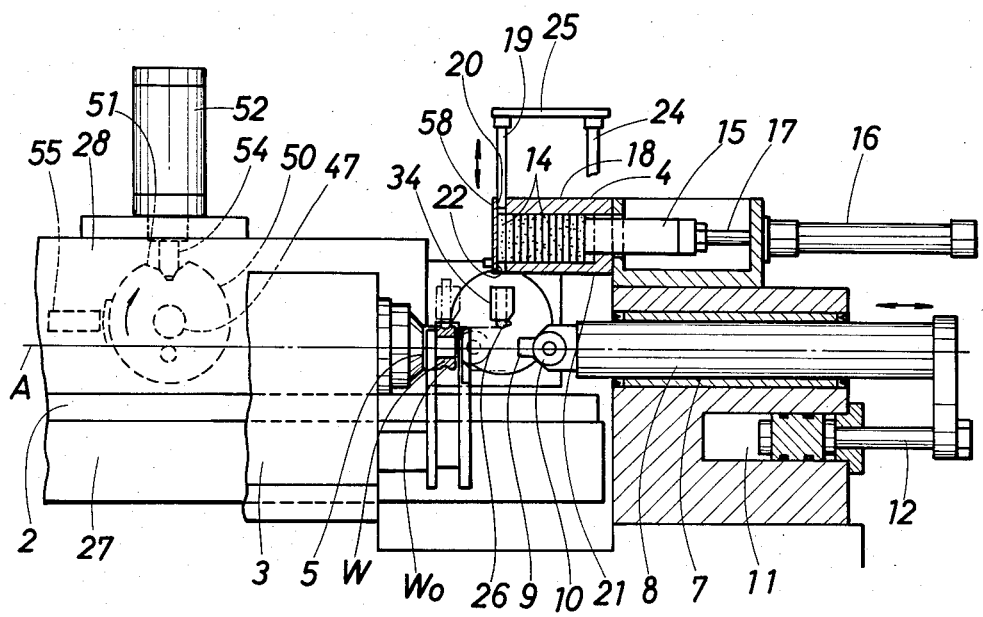
Figure 3:
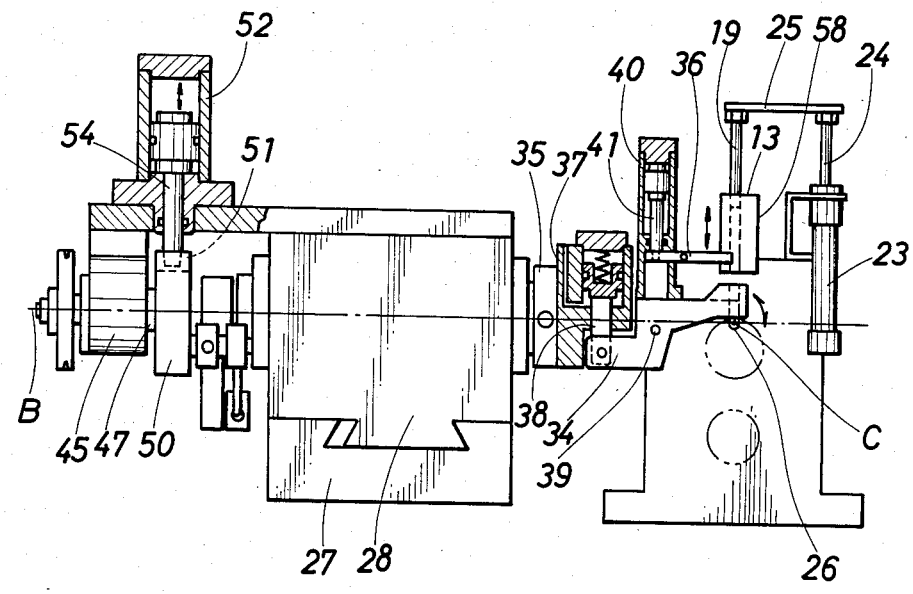

FIG. 1 is a plan view of a superfinishing machine 1 for superfinishing the outer peripheral surface Wo of an annular workpiece, e.g., the inner ring W or a ball bearing by oscillating honing stones; FIG. 2 is a front view of the same; and FIG. 3 is a left-hand side view of the same.

Figure 4:
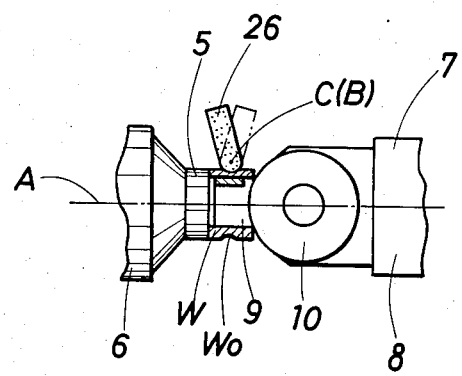

The annular workpiece W is rotated while it is pressed by a backing plate 5 installed on the front end of the main shaft 6 of a drive unit 3. Installed in front of the drive unit 3, as shown in FIG. 2, is a presser 7 for pressing the annular workpiece W against the backing plate 5. The presser 7 includes a sliding shaft 8, an inner diamter shoe 9 attached to the front end of said sliding shaft 8, and pressure rollers 10, the rear end of said sliding shaft 8 being connected to the cylinder rod 12 of a shoe operating cylinder 11. The annular workpiece W, as shown in FIG. 4, has its inner peripheral surface supported by the inner diameter shoe 9 of the presser 7 and is pressed against the backing plate 5 by the pressure rollers 10, so that it is rotated on the main axis A of the drive unit 3 by the so-called shoe centerless system.

A honing stone feed unit 4 is installed forwardly upwardly of the drive unit 3. The honing stone feed unit 4 comprises a reserve honing stone storage box 13 and a honing stone push-out lever 19.

In the reserve honing stone storage box 13, a plurality of reserve honing stones 14 are received upright in a line along the main axis A. These reserve honing stones 14 are constantly urged in the direction of the drive unit 3 (toward a front wall 58) by a honing stone pressing rod 15 installed in the rear portion of the reserve honing stone storage box 13, said honing stone pressing rod 15 being connected to the cylinder rod 17 of a honing stone pressing cylinder 16. The upper wall 18 of the reserve honing stone storage box 13 is formed with an insertion hole 20 for receiving a honing stone push-out lever 19 at a location where the foremost reserve honing stone 14 is positioned, while the lower wall 21 is formed with a honing stone discharge hole at a location opposed to said insertion hole 20.

The honing stone push-out lever 19, as shown in FIG. 3, is connected to the cylinder rod 24 of a honing stone push-out cylinder 23 through a connector 25, so that the honing stone push-out lever 19 is inserted into and withdrawn from the reserve honing stone storage box 13 as the cylinder rod 24 is lowered and raised, whereby the foremost reserve honing stone 14 is downwardly pushed out of the honing stone discharge hole 22. This honing stone push-out lever 19 makes upward and downward movement only at the time of stone exchange.

An oscillation unit 2 is installed laterally of said drive unit 3. The oscillation unit 2 serves to cause the honing stone 26 for superfinishing the outer peripheral surface Wo of the annular workpiece W to oscillate along the outer peripheral surface Wo, and as shown in FIG. 3, it includes a stationary base 27, and a slider 28 carried on and dovetailed to said stationary base 27, said slider 28 being movable in the direction of the main axis A of the drive unit 3. The movement of the slider 28 is caused by the forward and backward movement of the cylinder rod 30 of a slide index cylinder 29 installed forwardly of the stationary base 27 and connected to the slider 28, as shown in FIG. 1. The slider 28 is oscillatably provided with an oscillation shaft 32 through bearings 31. The oscillation shaft 32, as shown in FIGS. 3 and 4, is so arranged that its axis, i.e., oscillation axis B intersects the main axis A at right angles and, at the processing position, extends through the center of curvature C of the outer peripheral surface Wo of the annular workpiece W.

Installed at the front end 33 of the oscillation shaft 32 is a stone holder section 35 having a stone holder 34 for holding the honing stone 26. Disposed above the stone holder 34 is a honing stone pressing lever 36 for pressing the honing stone 26 against the outer peripheral surface Wo of the annular workpiece W. The stone holder 34, as shown in FIGS. 1 and 3, is connected to the cylinder rod 38 of a holder turning cylinder 37 installed in the stone holder section 35 and is upwardly turnable to the extent that at least the honing stone 26 is turned around the axis of a support shaft 39 away from the outer peripheral surface Wo of the annular workpiece W by the holder turning cylinder 37. The honing stone 26 held by the stone holder 34 is positioned on an extension of the oscillation axis B of the oscillation shaft 32 and adapted to be oscillated around the oscillation axis B. The stone pressing lever 36, as shown in FIG. 3, is connected to the cylinder rod 41 of a pressing cylinder 40 attached to the stone holder 34 and is adapted to be upwardly and downwardly moved integrally with the cylinder rod 41 and to be turned around the axis of the cylinder rod 41. Further, the stone pressing lever 36 is constantly urged by a spring 42 in a counterclockwise direction as viewed in FIG. 1.

A stone oscillating arm 44 is attached to the base 43 of said oscillation shaft 32 and is connected to an oscillation motor (not shown) through a crank unit 45. More particularly, said stone oscillating arm 44 is connected to one end of the crank shaft 47 of the crank unit 45, i.e., to a crank pin 48 through a connecting rod 46, the other end of said crank shaft 47 being connected to said oscillation motor through a pulley 49, so that the oscillation shaft 32 is oscillated around the oscillation axis B by the oscillation motor. Thereby, said honing stone 26 is oscillated around the center of curvature C of the outer peripheral surface Wo of the annular workpiece W so as to superfinish the outer peripheral surface Wo of the annular workpiece W into an arcuate cross-section (see FIG. 4). The numeral 50 denotes a circular crank wave attached to one end of said crank shaft 47 and formed on its outer periphery with a recess 51 for indexing purposes to be later described.

Further, said slider 28 is provided with an indexing stopper 52 and a positioning stopper 53 for fixing the oscillating shaft 32 at a predetermined position, i.e., the position where the honing stone 26 is to be exchanged. The indexing stopper 52 serves to index the fixing position of the oscillation shaft 32 and, stated concretely, it is in the form of an indexing cylinder. This indexing cylinder 52, as shown in FIGS. 2 and 3, is disposed upside down at a position corresponding to the crank wave 50 of said crank unit 45, the arrangement being such that its cylinder rod, i.e., the stopper portion 54 is inserted from above into the recess 51 of the crank wave 50 to stop the rotation of the crank shaft 47, thereby indexing the fixing position of the oscillation shaft 32. The fixing position is set at a position where the honing stone 26 intersects the main axis A at right angles. Further, the indexing cylinder 52 is adapted to be actuated by a fixing position confirmation switch 55 which confirms that the recess 51 of the crank wave 50 is correspondingly positioned below the stopper portion 54.

The aforesaid positioning stopper 53 serves to position and fix the oscillation shaft 32 at a fixing position indexed by said stopper 52, and stated concretely, it is in the form of a positioning cylinder. This positioning cylinder 53, as shown in FIG. 1, is positioned to intersect the oscillation axis B of the oscillation shaft 32 at right angles and is so arranged that when the indexing stopper 52 is engaged with the recess 51 of the crank wave 50, the cylinder rod, i.e., the stopper portion 56 is inserted into the fixing hole 57 in the lateral surface of the oscillation shaft 32 so as to position and fix the oscillation shaft 32.

As described above, the honing stone exchanger is composed of the indexing stopper (cylinder) 52, positioning stopper (cylinder) 53, stone feed unit 4, slide index cylinder 29, and holder turning cylinder 37. Further, the cylinders 23, 29, 37, 52, and 53 are interlocked to each other and electrically controlled by a control unit (not shown).

The operation of the honing stone exchanger of the aforesaid arrangement will now be described.

(1) When the honing stone 26 pressed against the outer peripheral surface Wo of the annular workpiece W becomes worn out and no longer usable, this fact is detected by the control unit from the amount of downward movement of the pressing cylinder 40 and an electric signal is emitted. Then, the oscillation motor is decelerated to very slow speed rotation and hence the crank wave 50 connected to said motor is also decelerated to very slow rotation.

(2) When the predetermined position confirmation switch 55 confirms that the recess 51 of the crank wave 50 is positioned below the stopper portion 54 of the indexing stopper 52, the indexing stopper 52 is actuated to insert the stopper portion 54 into the recess 51 to thereby index the fixing position of the oscillation shaft 32.

(3) The positioning stopper 53 is actuated to insert its stopper portion 56 into the fixing hole 57 of the oscillation shaft 32 to thereby position and fix the oscillation shaft 32.

(4) When the oscillation shaft 32 is fixed, the indexing stopper 52 is actuated again to retract the stopper portion 54 from the recess 51 of the crank wave 50.

(5) When said fixing results in fixing the honing stone 26 to intersect the main axis A at right angles, the pressing cylinder 40 is raised to remove the pressure of the stone pressing lever 36 from the honing stone 26, while the holder turning cylinder 37 is actuated to upwardly turn the stone holder 34 so as to move the honing stone 26 away from the outer peripheral surface Wo of the annular workpiece W.

(6) The slide index cylinder 29 is actuated to cause horizontal movement of the slider 28 in a horizontal direction (to the right in FIG. 1), and the stone holder 34 is moved to be positioned below the reserve honing stone storage box 13. At this time, the honing stone pressing lever 36 positioned above the stone holder 34 is turned clockwise as viewed in FIG. 1 by the front wall 58 of the reserve honing stone storage box 13 in response to the horizontal movement of the slider 28 and is moved away from above the stone holder 34 against the force of the spring 42.

(7) When the honing stone 26 held by the stone holder 34 is moved to be positioned below the honing stone discharge hole 22 of the reserve honing stone storage box 13, the holder turning cylinder 37 is actuated again to downwardly turn the stone holder 34 until the honing stone returns to its position intersecting the main axis A at right angles. Thereby, the honing stone 26 and the foremost reserve honing stone 14 in the reserve honing stone storage box 13 are vertically aligned, that is, come into line in the push-out direction of the reserve honing stones 14.

(8) The stone push-out cylinder 23 is actuated to lower the stone push-out lever 19 to downwardly push out the foremost reserve honing stone 14 in the reserve honing stone storage box 13. In response thereto, the honing stone 26 in the stone holder 34 is pushed out by the reserve honing stone 14, and the latter, in place of the used honing stone 26, is held by the stone holder 34. In addition, in order that the reserve honing stone 14 may be easily held, the stone holder 34 will intimately hold the honing stone to the extent that the honing stone will not come off unless it is subjected to external force.

(9) Upon completion of exchange of honing stones, the honing stone exchanger returns to its reset state through the reverse of the operation described above, with the superfinishing machine thus assuming the superfinishing state again. That is, the honing stone push-out lever 19 is raised, the stone holder 34 is upwardly turned, the slide index cylinder 29 is actuated to move the slider 28 to the left in FIG. 1, and finally the stone holder 34 is lowered to return to the processing position, with the honing stone exchanger being restored to its reset state. In addition, when the honing stone push-out lever 19 has been raised back to its position, the reserve honing stones 14 stored in the reserve honing stone storage box 13 will be pushed out forwardly (to the left in FIG. 1) by an amount corresponding to one stone by the honing stone pressing lever 15.

When the exchange is completed in the manner described above, the honing stone pressing lever 36 presses the fresh honing stone 14 against the outer peripheral surface Wo of the annular workpiece W, while the superfinishing machine 1 automatically restarts superfinishing.

Another embodiment of the invention applied to a superfinishing machine for superfinishing the inner peripheral surfaces of annular workpieces will now be described with reference to the drawings.

Figure 5:
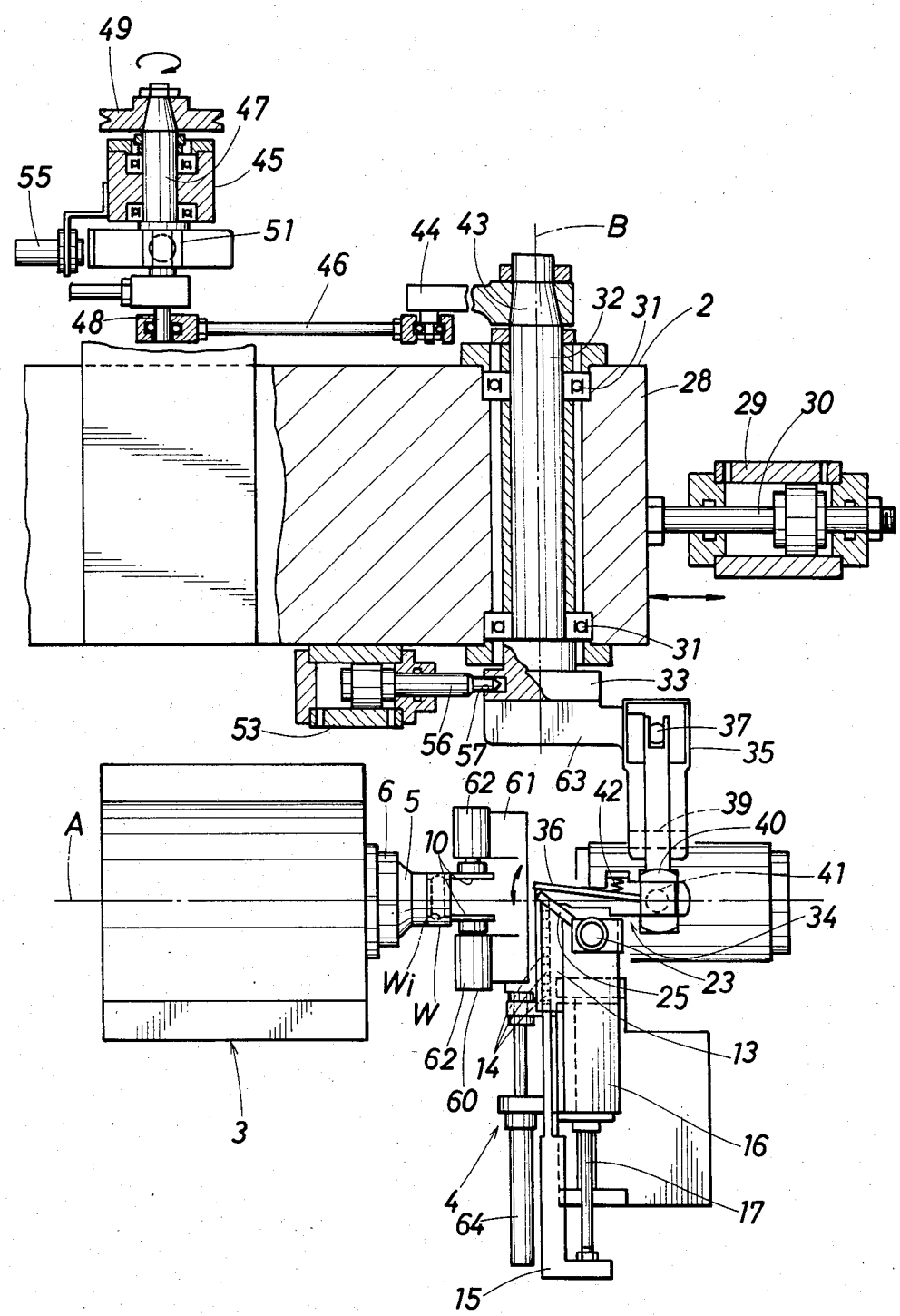
Figure 6:
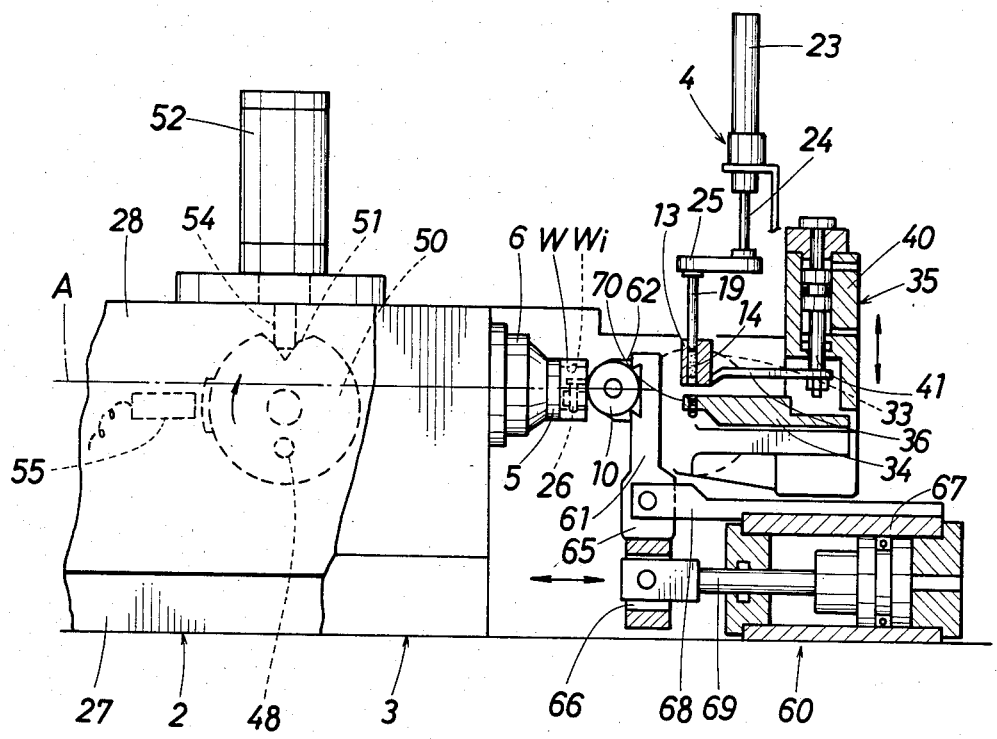
Figure 7:
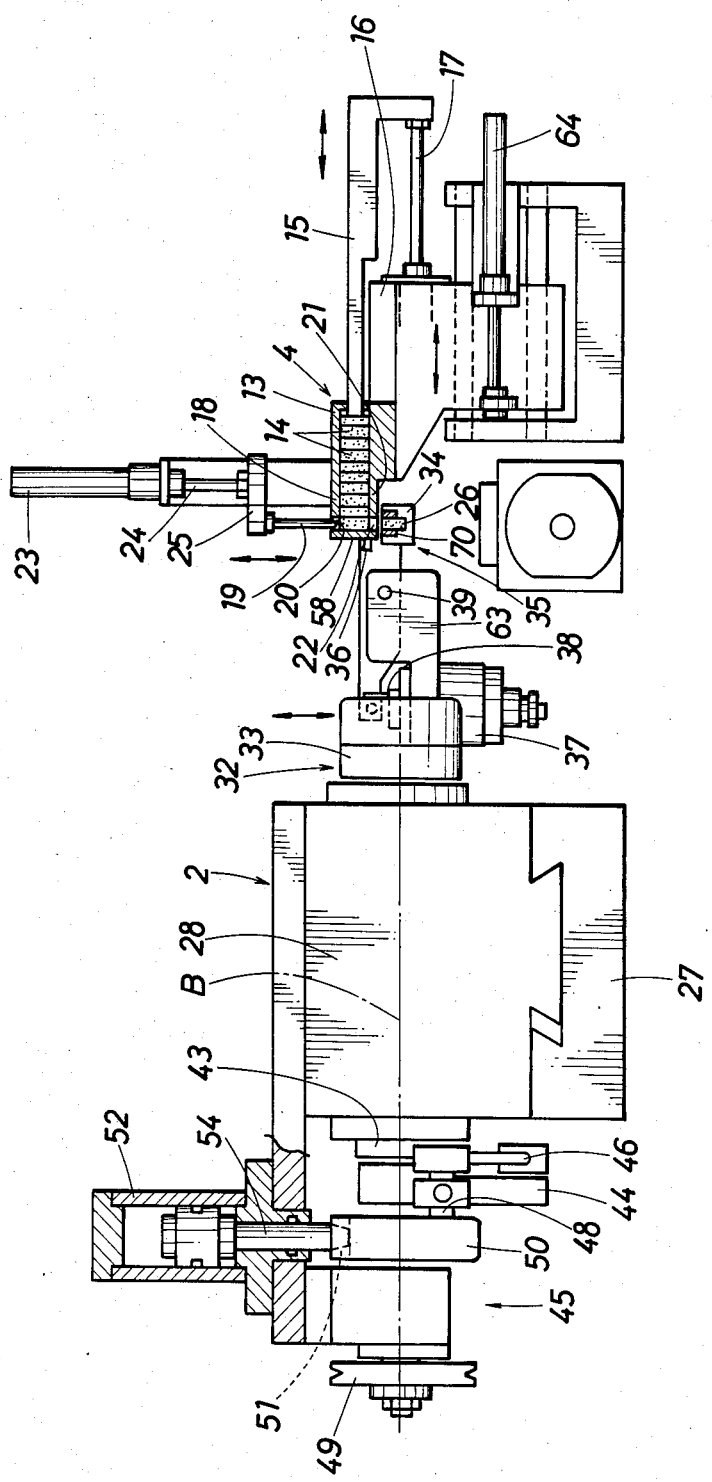

FIG. 5 is a plan view of superfinishing machine for superfinishing an annular workpiece, stated concretely, the inner peripheral surface Wi of the outer ring W of a ball bearing; FIG. 6 is a front view of the same; and FIG. 7 is a left-hand side view of the same.

The superfinishing machine 1 superfinishes an annular workpieces, stated concretely, the inner peripheral surface Wi of the outer ring W of a ball bearing, and comprises an oscillation unit 2 and a drive unit 3.

Figures 8, 9:
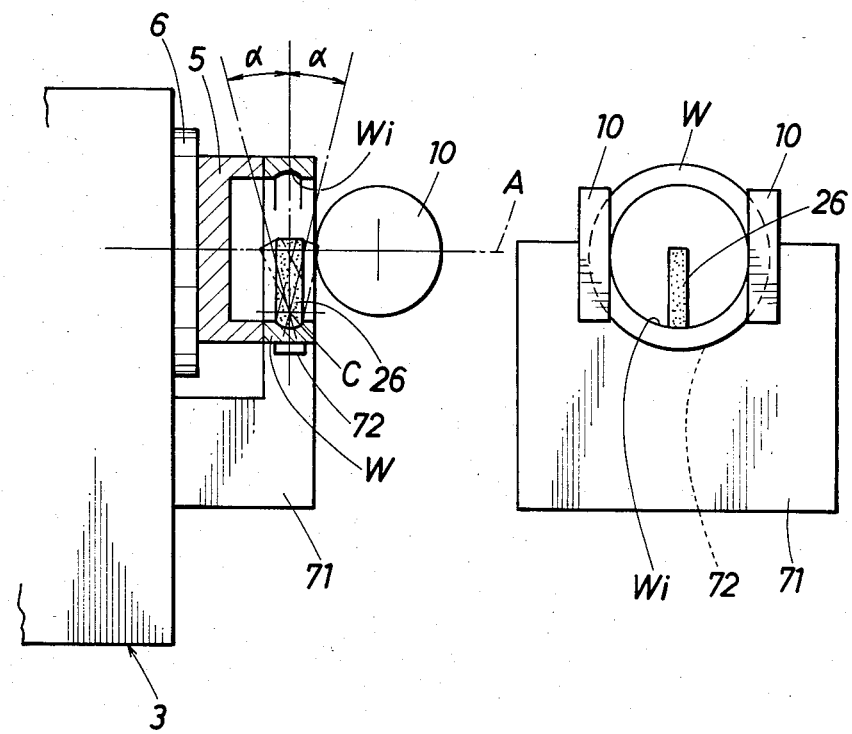

The drive unit 3, which serves to rotate said workpiece W, has a backing plate 5 at the front end of a main shaft 6 for rotatably supporting the outer ring W and, as shown in FIGS. 8 and 9, has a support arm 71 at its front end which is provided with a shoe 72 for supporting the lower side of the outer periphery of the workpiece W to position the same. On the other hand, located forwardly of the drive unit 3 is a clamp unit 60 for pressing the workpiece W against said backing plate 5. The clamp unit 60, as shown in FIG. 6, has pressure rollers 10 abutting against the lateral surface of the workpiece W, said rollers being rotatably attached to the front end 62 of a clamp arm 61, the middle portion 65 of said clamp arm 61 being rotatably supported by the support portion 68 of a clamp cylinder 67, while its base end 66 is connected to the cylinder rod 69 of the clamp cylinder 67. Thus, as shown in FIGS. 8 and 9, the workpiece W has its outer peripheral surface supported by said shoe 72 and is pressed by the pressure rollers 10, so that it is rotated on the main axis A in the so-called centerless system.

The oscillation unit 2 causes the honing stone 26 which superfinishes the inner peripheral surface Wi of the workpiece W to oscillate along said inner peripheral surface Wi, said oscillation unit being disposed laterally of said drive unit 3. In addition, the arrangement of this drive unit 2 is substantially the same as that of the one disclosed in the preceding embodiment (shown in FIGS. 1 through 3) except for the arrangement of the stone holder section 35. Further, the arrangement of the crank unit 45 is also the same as in the preceding embodiment.

The stone holder section 35 for holding the honing stone 26 is installed at the front end 33 of the oscillation shaft 32 and provided with a stone holder 34 and a stone pressing lever 36.

The stone holder 34, as shown in FIG. 7, has its front end formed to serve as a holder and is rotatably supported at its middle by a support shaft 39 in a base 63 attached to said front end 33 and is connected at its rear end to the cylinder rod 38 of the holder turning cylinder 37 so that said stone holder 34 is vertically movable between the processing position and the spaced position. In addition, the stone holder 34 has a stone pressing plate spring 70 installed therein for pressing and holding the honing stone 26 and is so arranged that the honing stone 26 held by the stone holder 34 is positioned on the oscillation axis B at said processing position. The stone pressing lever 36 serves to press the honing stone 26 against the inner peripheral surface Wi of the workpiece W with a fixed pressure and is attached to the cylinder rod 41 of a pressing cylinder 40 installed in said stone holder section 35, as shown in FIG. 6, with its front end abutting against the upper end of the housing stone 26. The stone pressing lever 36 is turnable around the axis of the cylinder rod 41 and, as shown in FIG. 5, is constantly urged counterclockwise by a spring 42.

The stone feed unit 4 in this embodiment is in the form of the stone feed unit in the preceding embodiment but provided with means for moving said unit to the stone exchange position, the basic arrangement being the same as in the preceding embodiment.

The stone feed unit 4 is installed forwardly of the drive unit 3 and is movable by the slide cylinder 64 in the direction which intersects the main axis A at right angles. The stone feed unit 4 comprises a reserve stone storage box 13 for storing said reserve honing stones 14, and a stone push-out lever 19 for pushing out said reserve stones 14.

The reserve stone storage box 13 is positioned at right angles to the main axis A and has said reserve stones 14 stored therein upright in a line. These reserve stones 14 are constantly pressed forwardly with low pressure by the stone push-out lever 15 installed rearwardly of the reserve stone storage box 13, said stone push-out lever 15 being connected to the cylinder rod 17 of the stone pressing cylinder 16. Further, as shown in FIG. 7, the lower wall 21 of the reserve stone storage box 13 is provided with a stone discharge hole 22 for discharging the foremost reserve stone 14, while the upper wall 18 is provided with an insertion hole 20 opposed to said stone discharge hole 22 for receiving said stone push-out lever 19.

The stone push-out lever 19 is connected through a connector 25 to the cylinder rod 24 of the stone push-out cylinder 23 so as to push down the foremost honing stone 14 in the reserve stone storage box 13 through said insertion hole 20.

In addition, the stone push-out cylinder 23, slide index cylinder 29, holder turning cylinder 37, index stopper 52, positioning stopper 53, and slide cylinder 64 are interconnected and electrically controlled by a control unit (not shown).

Thus, in said superfinishing machine 1, the workpiece W is rotated by the drive unit 3 in the centerless system, while the honing stone 26 is oscillated by the oscillation unit 2 concentrically with the center of curvature C of the inner peripheral surface Wi of the workpiece W to superfinish the inner peripheral surface Wi into an arcuate cross-section (see FIG. 8). When the honing stone 26 has been used to its wear limit, it is automatically exchanged for a fresh honing stone 14 by the stone feed unit 4.

The operation of the honing stone exchanger of the above arrangement will now be described.

(1) When the honing stone 26 being pressed against the inner peripheral surface Wi of the workpiece W has worn out to become no longer usable, the control unit detects this fact from the amount of downward movement of the pressing cylinder 40 and produces an electric signal, whereupon the stone pressing lever 36 is raised by said pressing cylinder 40 to remove its pressure on the honing stone 26 and the superfinishing is interrupted.

(2) The holder turning cylinder 37 is actuated to move the stone holder 34 upwardly from the processing position to the spaced position so as to move the honing stone 28 away from the inner peripheral surface Wi.

(3) The slide index cylinder 29 is actuated to move the slider 28 of the oscillation unit 2 to the right as viewed in FIG. 5, and the honing stone 26 is taken out of the workpiece W.

(4) While the crank shaft 47 of the crank unit 45 is being rotated by the oscillation motor, a position confirmation switch 55 confirms the position of a recess 51 in a crank wave 50, whereby the index cylinder 52 is actuated to insert its stopper portion 54 into the recess 51 and to fix it therein, thereby indexing the fixing position of the oscillation shaft 32.

(5) The positioning cylinder 53 is actuated to insert its stopper portion 56 into the fixing hole 57 of the oscillation shaft 32 and to fix it therein, thereby positioning and fixing said oscillation shaft 32.

(6) The holder turning cylinder 37 is actuated again to move the stone holder 34 downwardly from the spaced position to the processing position.

(7) The slide cylinder 64 is actuated to advance the stone feed unit 4, whereby the front wall 58 of the reserve stone storage box 13 presses the stone pressing lever 36 against the force of the spring 42, turning it clockwise. As a result, the stone holder 34 is positioned below the reserve stone storage box 13 and the honing stone 26 in said stone holder 34 and the foremost honing stone 14 in the reserve stone storage box 13 are vertically aligned, that is, come into line in the push-out direction of the reserve honing stones 14.

(8) The stone push-out cylinder 23 is actuated to lower the stone push-out lever 19 to downwardly push out the foremost honing stone 14. In response thereto, said reserve honing stone 14 is inserted into this stone holder 34 while pushing the worn-out honing stone 26 out of the stone holder 34 against the force of the stone pressing plate spring 70; thus, in place of said worn-out honing stone 26, it is held under pressure by the stone pressing plate spring 70.

(9) Upon completion of exchange of honing stones, the honing stone exchanger returns to its reset state through the reverse of the operation described above. That is, the honing stone push-out lever 19 is raised, the stone feed unit 4 is retracted, the stone pressing lever 36 is turned counterclockwise by the spring 42, the stone holder 34 is raised to the spaced position, the stopper portion 56 of the positioning cylinder 53 is retracted, the slider 28 is moved to the left in FIG. 5, and finally the stone holder 34 is lowered to the processing position, with the honing stone exchanger returning to its reset position. In addition, when the honing stone push-out lever 19 has been raised back to its position, the reserve honing stones 14 stored in the reserve honing stone storage box 13 will be pushed out forwardly by an amount corresponding to one honing stone by the honing stone pressing lever 15.

When the exchange is completed in the manner described above, the honing stone pressing lever 36 is lowered and the superfinishing machine 1 automatically starts superfinishing again.

As has been described so far, the honing stone exchanger of the present invention is capable of automatically exchanging honing stones without requiring any manual operation, thus ensuring increased efficiency of operation and reduced production cost, achieving outstanding merits particularly in superfinishing machines for mass-producing parts such as bearings.

What is claimed is:

1. A superfinishing machine comprising:
   drive means for rotating an annular workpiece around a first axis;
   a honing stone holder, movable between a processing position and a honing stone feeding position, said honing stone holder including means for holding a honing stone which superfinishes one of an outer peripheral surface and an inner peripheral surface of the annular workpiece and for bringing the honing stone into contact with the one of the peripheral surfaces of the workpiece when said honing stone holder is in said processing position;
   pressing means for pressing the honing stone against the one peripheral surface of the workpiece in a direction of a second axis intersecting said first axis at right angles, said pressing means including
   a pressing lever for pressing the honing stone when said pressing lever is in a pressing position,
   means, on said honing stone holder, for pushing said pressing lever in said direction of said second axis against the honing stone, said pressing lever being pivotally mounted to said pushing means so as to be pivotable about a lever axis parallel to said second axis into and out of said pressing position, and means for elastically urging said pressing lever pivotally about said lever axis toward said pressing position;

an oscillation means, including an oscillation shaft coupled to said honing stone holder, for oscillating said honing stone holder through said oscillation shaft around a third axis intersecting said first and second axes at right angles;

a crank means for transmitting power from a drive motor to said oscillation shaft to oscillate said oscillation shaft; and a honing stone exchanger, including fixing means for stopping oscillation of said oscillation shaft and fixing said shaft at a predetermined position, moving means for moving said honing stone holder and said pressing means therewith, along said first axis between said processing position and said honing stone feeding position, and honing stone feeding means, including a storage means for storing a plurality of reserve honing stones, for feeding a reserve honing stone from said storing means to said honing stone holder when said honing stone holder is in said honing stone feeding position;

said honing stone feeding means comprising means, on said storage means in the path of said pressing lever when said honing stone holder and said pressing means are moved by said moving means from said processing position to said honing stone feeding position, for engaging said pressing lever when said honing stone holder and said pressing means are moved by said moving means from said processing position to said honing stone feeding position so as to pivot said pressing lever, against the urging of said elastically urging means, away from said pressing position, and means including a press-out lever positioned so as to be aligned with the honing stone in said honing stone holder and a reserve holding stone in said storage means when said honing stone holder is in said honing stone feeding position, for pushing the reserve honing stone from said storage means into said honing stone holder so as to displace the holding stone therein.

2. A machine as set forth in claim 1, wherein said fixing means comprises indexing means for stopping the oscillation of said oscillation shaft and indexing a fixing position of said oscillation shaft, at which said oscillation is stopped and positioning means for positioning and fixing at said predetermined position said oscillation shaft with said fixing position indexed by said indexing means.

3. A machine as set forth in claim 2, wherein said crank means comprises a crank shaft, said indexing means including a crank wave having an outer periphery, installed on said crank shaft and having a recess on said outer periphery, a first stopper adapted to be inserted and fixed in said recess of said crank wave to stop the rotation of the crank wave, and means for actuating said first stopper when detecting said recess coming to a position corresponding to said first stopper, said positioning means comprising a fixing hole formed on a periphery of said oscillation shaft, and a second stopper adapted to be inserted and fixed in said fixing hole to fix said oscillation shaft.

4. A machine as set forth in claim 1, wherein said moving means comprises holder turning means provided on said honing stone holder for turning the honing stone holder around an axis which is parallel to said first axis so as to move the honing stone away from said peripheral surface of the workpiece, and means connected to said oscillation means for moving said oscillation means parallel to said first axis along the direction of said first axis so as to move said honing stone holder to said honing stone feeding position.

5. A machine as set forth in claim 1, wherein said storage means comprises a reserve honing stone storage box for storing a plurality of said reserve honing stones arranged parallel to said second axis, and reserve stone pressing means connected to said reserve honing stone storage box for pressing said reserve honing stone to a position where said reserve honing stone is pushed out of said storage box by said push-out lever.

6. A machine as set forth in claim 1, wherein said elastically urging means includes an elastic body which constantly urges said pressing lever toward said pressing position, the arrangement being such that when said honing stone holder is moved to said honing stone feeding position, said pressing lever is pushed by said storage box and turned against the elastic force of said elastic body.

7. A superfininshing machine as in claim 1, wherein said pressing means comprises a pressing cylinder fixedly mounted on said honing stone holder, a cylinder rod reciprocally movably mounted in said pressing cylinder for movement in parallel to said second axis, said pressing lever being pivotally mounted to said cylinder rod.

8. A superfinishing machine as in claim 1, wherein said storage means comprises a honing stone storage box, said means for engaging said pressing lever comprising a portion of said storage box which engages said pressing lever when said honing stone holder and said pressing means are moved by said moving means from said processing position to said honing stone feeding position so as to pivot said pressing lever, against the urging of said elastically urging means, away from said pressing position.

9. A superfinishing machine comprising:

drive means for rotating an annular workpiece around a first axis;

a honing stone holder, movable between a processing position and a honing stone feeding position, said honing stone holder including means for holding a honing stone which superfinishes one of an outer peripheral surface and an inner peripheral surface of the annular workpiece and for bringing the honing stone into contact with the one of the peripheral surfaces of the workpiece when said honing stone holder is in said processing position;

pressing means for pressing the honing stone against the one peripheral surface of the workpiece in a direction of a second axis intersecting said first axis at right angles, said pressing means including a pressing lever for pressing the honing stone when said pressing lever is in a pressing position and means for pushing said pressing lever in said direction of said second axis against the honing stone;

an oscillation means, including an oscillation shaft coupled to said honing stone holder, for oscillating said honing stone holder through said oscillation shaft around a third axis intersecting said first and second axes at right angles;

a crank means for transmitting power from a drive motor to said oscillation shaft to oscillate said oscillation shaft; and a honing stone exchanger, including fixing means for stopping oscillation of said oscillation shaft and fixing said shaft at a predetermined position, moving means for moving said honing stone holder and said pressing means therewith, along said first axis between said processing position and said honing stone feeding position, and honing stone feeding means, including a storage means for storing a plurality of reserve honing stones, for feeding a reserve honing stone from said storing means to said honing stone holder when said honing stone holder is in said honing stone feeding position;

said honing stone feeding means comprising spacing means for spacing said pressing lever away from said honing stone pressing position, a press-out lever, and means for moving said storage means and said push-out lever to said honing stone feeding position such that said press-out lever is positioned so as to be aligned with the honing stone in said honing stone holder and a reserve holding stone in said storage means when said honing stone holder is in said honing stone feeding position, said push-out lever being operable when said push-out lever is axially aligned with the honing stone in said honing stone holder for pushing the reserve honing stone from said storage means into said honing stone holder.

10. A machine as set forth in claim 9, wherein said storage means comprises a reserve honing stone storage box for storing a plurality of said reserve honing stones parallel to said second axis, and pressing means connected to the reserve honing stone storage box for pressing the reserve honing stone to move the reserve honing stone to a position where the reserve honing stone is pushed out by said push-out lever.

11. A machine as set forth in claim 9, wherein said spacing means comprises turning means for turning said pressing lever around an axis parallel to said second axis.

12. A machine as set forth in claim 11, wherein said turning means includes an elastic body which constantly urges said pressing lever toward said pressing position, and a portion of said storage means disposed such that when said honing stone holder is moved to said honing stone feeding position, said pressing lever is engaged by said portion of said storage means and pushed by said storage means and turned against the elastic force of said elastic body away from said pressing position.

* * * * *